US012422132B2

(12) United States Patent
Das

(10) Patent No.: US 12,422,132 B2
(45) Date of Patent: Sep. 23, 2025

(54) REMOTE LIGHT ADJUSTMENT APPARATUS FOR AUDIO-VISUAL APPLICATIONS

(71) Applicant: Matthews Studio Equipment, Inc., Burbank, CA (US)

(72) Inventor: Erno Radmer Das, Amsterdam (NL)

( * ) Notice: Subject to any disclaimer, the term of this patent is extended or adjusted under 35 U.S.C. 154(b) by 0 days.

(21) Appl. No.: 18/801,705

(22) Filed: Aug. 12, 2024

(65) Prior Publication Data

US 2025/0052406 A1 Feb. 13, 2025

Related U.S. Application Data

(60) Provisional application No. 63/532,357, filed on Aug. 12, 2023.

(51) Int. Cl.

| | |
|---|---|
| ***F21V 21/15*** | (2006.01) |
| ***F21V 21/22*** | (2006.01) |
| ***F21V 21/30*** | (2006.01) |
| ***F21W 131/10*** | (2006.01) |

(52) U.S. Cl.
CPC .............. *F21V 21/15* (2013.01); *F21V 21/22* (2013.01); *F21V 21/30* (2013.01); *F21W 2131/1005* (2013.01)

(58) Field of Classification Search
CPC .......... F21V 21/22; F21V 21/30; F21V 21/15; F21W 2131/406; F21W 2131/1005
See application file for complete search history.

(56) References Cited

U.S. PATENT DOCUMENTS

| | | | | |
|---|---|---|---|---|
| 5,203,621 | A * | 4/1993 | Weinmeister | B60Q 1/2611<br>362/486 |
| 6,854,862 | B1 * | 2/2005 | Hopf | F21V 17/007<br>362/418 |
| 10,274,175 | B1 * | 4/2019 | Wood | G01D 5/145 |
| 11,988,368 | B1 * | 5/2024 | Harnisch | F21V 21/30 |
| 2013/0128565 | A1 * | 5/2013 | Cugini | F21V 21/145<br>362/184 |
| 2018/0292069 | A1 * | 10/2018 | Callahan | G02B 26/101 |
| 2020/0326060 | A1 * | 10/2020 | Fitch | F21V 21/28 |
| 2025/0036899 | A1 * | 1/2025 | Callegari | H05B 47/175 |

* cited by examiner

*Primary Examiner* — William N Harris
(74) *Attorney, Agent, or Firm* — Obi Iloputaife

(57) ABSTRACT

An apparatus for remotely controlling mobile and field deployed audio-visual lighting equipment includes a main body coupled to a light fixture and configured to be secured to an external structure. The main body includes a panning motor for pan control of the light fixture relative to the external structure. The main body further includes a telescopic arm coupled to the light fixture for tilt control of the light fixture. The apparatus further comprising a remote body couplable to the light fixture for spot control of the lighting in the light fixture, and a hand control unit for remotely operating both the main body and the remote body.

18 Claims, 9 Drawing Sheets

REMOTE LIGHT ADJUSTMENT APPARATUS FOR AUDIO-VISUAL APPLICATIONS

CROSS-REFERENCE TO RELATED APPLICATIONS

The present application claims the benefit of U.S. Provisional Application Ser. No. 63/532,357, filed on Aug. 12, 2023, specification of which is herein incorporated by reference for completeness of disclosure.

BACKGROUND OF THE INVENTION

Field of the Invention

Embodiments of the invention relates to the field of audio-visual lighting control. More specifically, the invention relates to an apparatus for remotely controlling mobile and field deployed audio-visual lighting equipment.

Description of the Related Art

Location filming of movies and television events often involve deployment of mobile lighting fixtures. These light fixtures are often mounted on extendable towers, e.g. stands, cranes and jib arms, that can be raised or lowered to specific heights, depending on the lighting requirement. Different scenes may require different lighting conditions thus necessitating either climbing up and down a ladder, or the lowering of the light fixture to a human reachable height in order to make the proper adjustment and then raising the fixture after the adjustment is made. These lowering and raising of the fixture may be performed several times until the proper lighting condition is achieved.

To overcome the problems and limitations described above there is a need for a cost-effective universal mounting apparatus for supporting practically most audio-visual applications.

BRIEF SUMMARY OF THE INVENTION

One or more embodiments of the invention are directed to an apparatus for remotely controlling mobile and field deployed audio-visual lighting equipment. The remote light adjustment device comprises a main body couplable to a light fixture and configured to be secured to an external structure, e.g. a telescopic tower.

In one or more embodiments, the main body comprises a first motor for panning the main body on the external structure, wherein the panning movement of the main body translates into panning movement of the light fixture via side to side movement of the an extending arm coupling said main body to said light fixture.

In one or more embodiments, the extending arm is coupled to the main body via one or more rails and to the light fixture via a coupling arm having locking jaw, with slide control and configured to allow panning of the light fixture. The extending arm further comprises a plurality of telescopic tubular members configured for tilt control of the light fixture.

One or more embodiments of the present invention further comprises a remote body couplable to the light fixture for spot control of the lighting in the light fixture.

One or more embodiments of the present invention further comprises a hand control unit for remotely controlling of the main body and remote body.

BRIEF DESCRIPTION OF THE DRAWINGS

The above and other aspects, features and advantages of the invention will be more apparent from the following more particular description thereof, presented in conjunction with the following drawings wherein.

DETAILED DESCRIPTION

Figure 1:
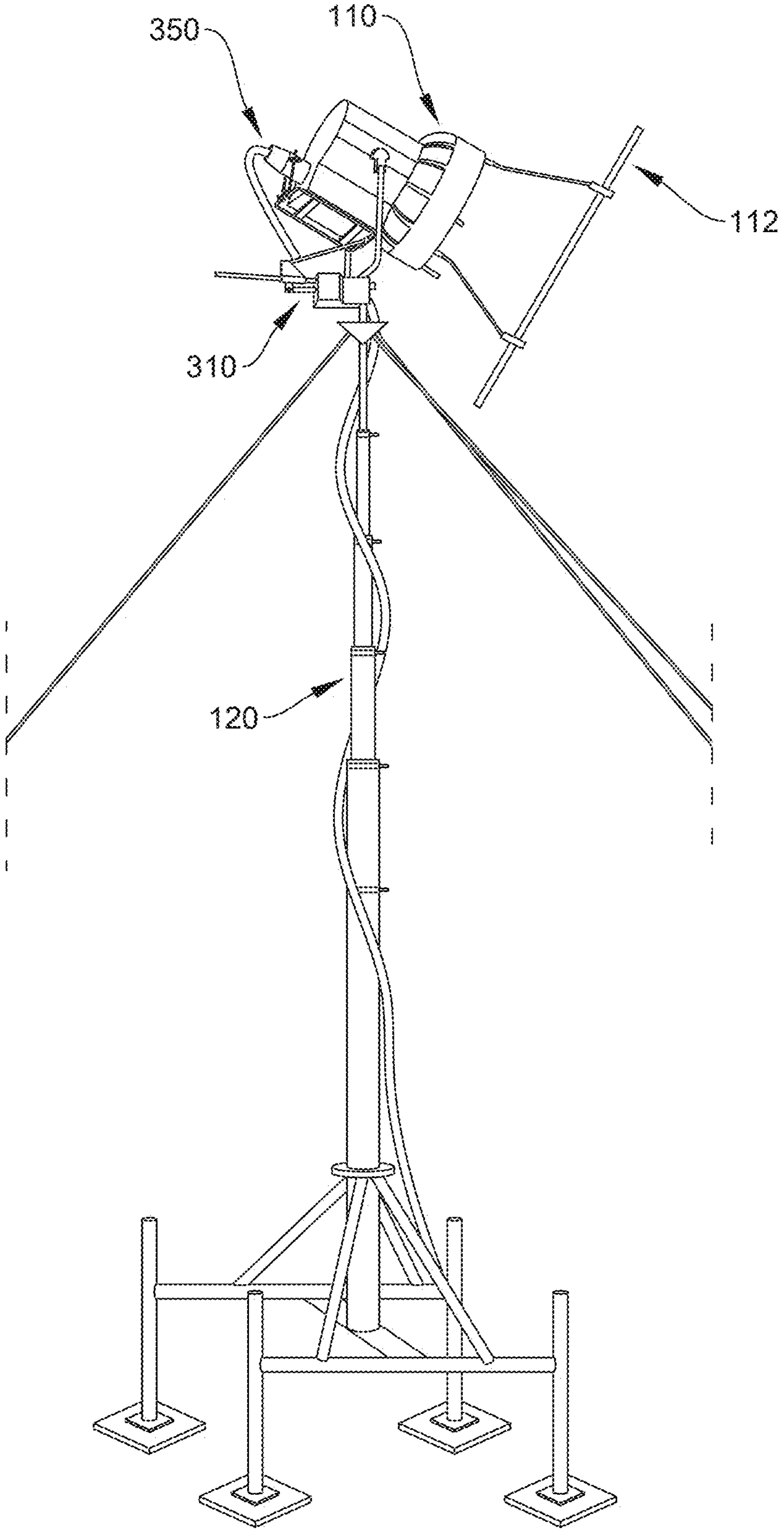
FIG. 1 is an illustration of the remote light adjustment apparatus in accordance with an embodiment of the present invention presented in a field deployment on a telescoping tower 120.

The present invention comprising a remote light adjustment apparatus for audio-visual applications will now be described. In the following exemplary description numerous specific details are set forth in order to provide a more thorough understanding of embodiments of the invention. It will be apparent, however, to an artisan of ordinary skill that the present invention may be practiced without incorporating all aspects of the specific details described herein. Furthermore, although steps or processes are set forth in an exemplary order to provide an understanding of one or more systems and methods, the exemplary order is not meant to be limiting. One of ordinary skill in the art would recognize that the steps or processes may be performed in a different order, and that one or more steps or processes may be performed simultaneously or in multiple process flows without departing from the spirit or the scope of the invention. In other instances, specific features, quantities, or measurements well known to those of ordinary skill in the art have not been described in detail so as not to obscure the invention. It should be noted that although examples of the invention are set forth herein, the claims, and the full scope of any equivalents, are what define the metes and bounds of the invention.

For a better understanding of the disclosed embodiment, its operating advantages, and the specified object attained by its uses, reference should be made to the accompanying drawings and descriptive matter in which there are illustrated exemplary disclosed embodiments. The disclosed embodiments are not intended to be limited to the specific forms set forth herein. It is understood that various omissions and substitutions of equivalents are contemplated as circumstances may suggest or render expedient, but these are intended to cover the application or implementation.

The term "first", "second" and the like, herein do not denote any order, quantity or importance, but rather are used to distinguish one element from another, and the terms "a" and "an" herein do not denote a limitation of quantity, but rather denote the presence of at least one of the referenced items.

Spatially relative terms, such as "beneath," "below," "lower," "under," "above," "upper," and the like, may be used herein for ease of explanation to describe one element or feature's relationship to another element(s) or feature(s) as illustrated in the figures. It will be understood that the spatially relative terms are intended to encompass different orientations of the device in use or in operation, in addition to the orientation depicted in the figures. For example, if the device in the figures is turned over, elements described as "below" or "beneath" or "under" other elements or features would then be oriented "above" the other elements or features. Thus, the example terms "below" and "under" can encompass both an orientation of above and below. The device may be otherwise oriented (e.g., rotated 90 degrees or at other orientations) and the spatially relative descriptors used herein should be interpreted accordingly.

It will be understood that when an element or layer is referred to as being "on," "connected to," or "coupled to" another element or layer, it can be directly on, connected to, or coupled to the other element or layer, or one or more intervening elements or layers may be present. In addition, it will also be understood that when an element or layer is referred to as being "between" two elements or layers, it can be the only element or layer between the two elements or layers, or one or more intervening elements or layers may also be present.

As used herein, the term "substantially," "about," and similar terms are used as terms of approximation and not as terms of degree, and are intended to account for the inherent deviations in measured or calculated values that would be recognized by those of ordinary skill in the art. Further, the use of "may" when describing embodiments of the present invention refers to "one or more embodiments of the present invention." As used herein, the terms "use," "using," and "used" may be considered synonymous with the terms "utilize," "utilizing," and "utilized," respectively. Also, the term "exemplary" is intended to refer to an example or illustration.

As will be understood by one skilled in the art, for any and all purposes, such as in terms of providing a written description, all ranges disclosed herein also encompass any and all possible sub-ranges and combinations of sub-ranges thereof. Any listed range can be easily recognized as sufficiently describing and enabling the same range being broken down into at least equal halves, thirds, quarters, fifths, tenths, etc. As a non-limiting example, each range discussed herein can be readily broken down into a lower third, middle third and upper third, etc. As will also be understood by one skilled in the art all language such as "up to", "at least", "greater than", "less than", and the like include the number recited and refer to ranges which can be subsequently broken down into sub-ranges as discussed above. Finally, as will be understood by one skilled in the art, a range includes each individual member. Thus, for example, a group having 1-3 articles refers to groups having 1, 2, or 3 articles. Similarly, a group having 1-5 articles refers to groups having 1, 2, 3, 4, or 5 articles, and so forth. The phrases "and ranges in between" can include ranges that fall in between the numerical value listed. For example, "1, 2, 3, 10, and ranges in between" can include 1-1, 1-3, 2-10, etc. Similarly, "1, 5, 10, 25, 50, 70, 95, or ranges including and or spanning the aforementioned values" can include 1, 5, 10, 1-5, 1-10, 10-25, 10-95, 1-70, etc.

Unless otherwise defined, all terms (including technical and scientific terms) used herein have the same meaning as commonly understood by one of ordinary skill in the art to which the present invention belongs. It will be further understood that terms, such as those defined in commonly used dictionaries, should be interpreted as having a meaning that is consistent with their meaning in the context of the relevant art and/or the present specification, and should not be interpreted in an idealized or overly formal sense, unless expressly so defined herein.

One or more embodiments of the present invention will now be described with references to FIGS. 1-9.

One or more embodiments of the remote light adjustment apparatus 300 of the present invention comprises an automated universal remote head 310 made for adjusting light and/or reflector fixture positioning in field use from the ground. The remote light adjustment apparatus 300 is component-based, i.e. comprising the main body 310, the remote body 350, and the control unit 900, to accommodate audiovisual industry light fixtures and reflector boards. With an easy and familiar interface and with intuitive controls, the apparatus is made to save time and increase safety on set by eliminating the need to repeatably climb ladders and stands to aim a light or working on, sometimes, non-accessible heights.

The apparatus works with gaffers and lighting technicians to provide smooth remote pan, tilt and spot/flood focus control. The remote light adjustment apparatus 300 comprises three precision motors that quietly respond directly to the operator's input even while the fixture is actively in use on a stand, crane, jib arm or other set hardware. To accommodate various working conditions, remote light adjustment apparatus 300 may be set up in standard or inverted underslung configuration, so it is also convenient when working with a studio lighting grid, condor crane or manitou. Power is supplied by either a battery for wireless operation or may be cabled to suit the setup. While the invention herein disclosed has been described by means of specific embodiments and applications thereof, numerous modifications and variations could be made thereto by those skilled in the art without departing from the scope of the invention set forth in the claims.

Figure 2:
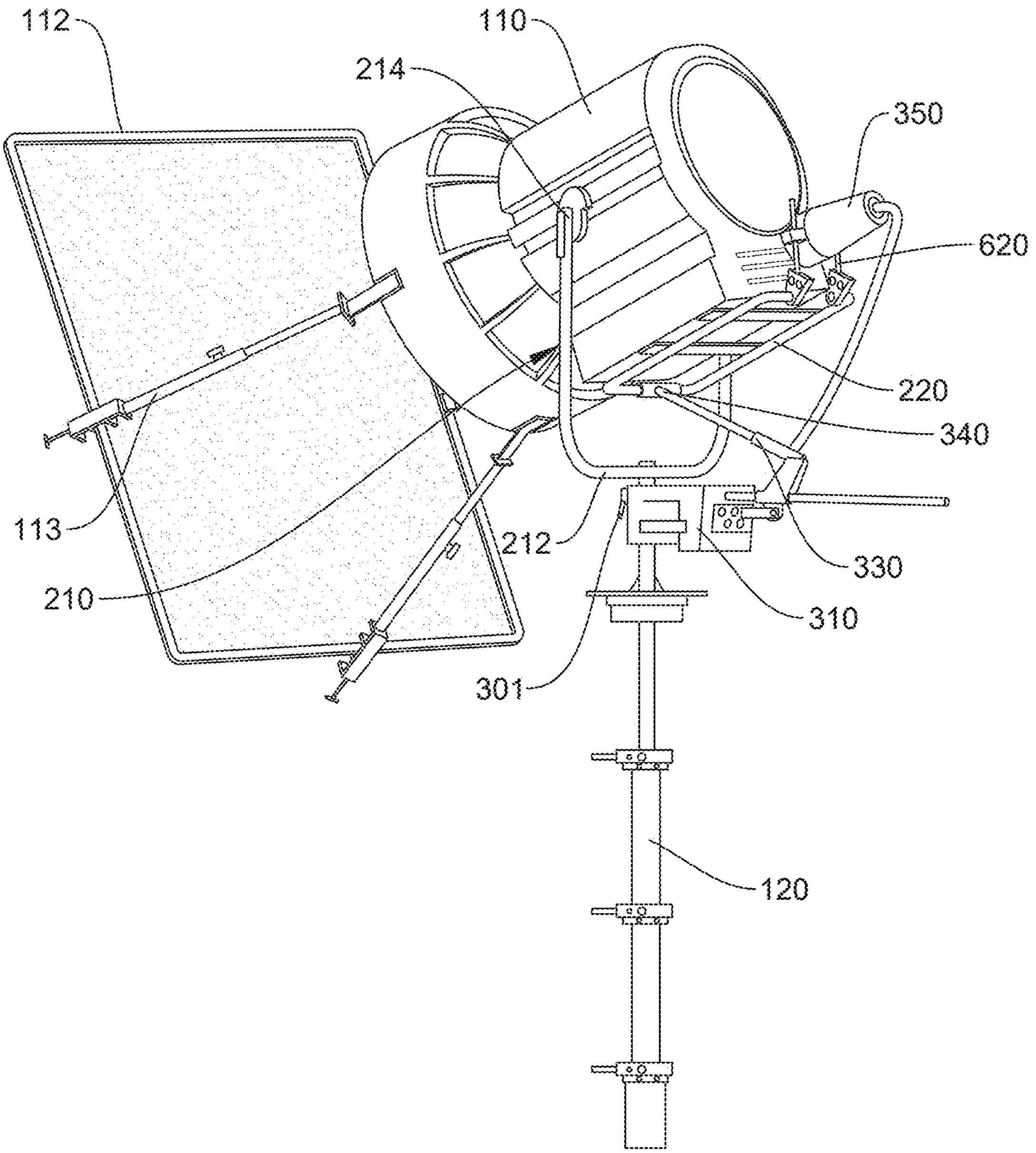
FIG. 2 is a close-up illustration of the remote light adjustment apparatus of FIG. 1, in accordance with an embodiment of the present invention.
Figure 3:
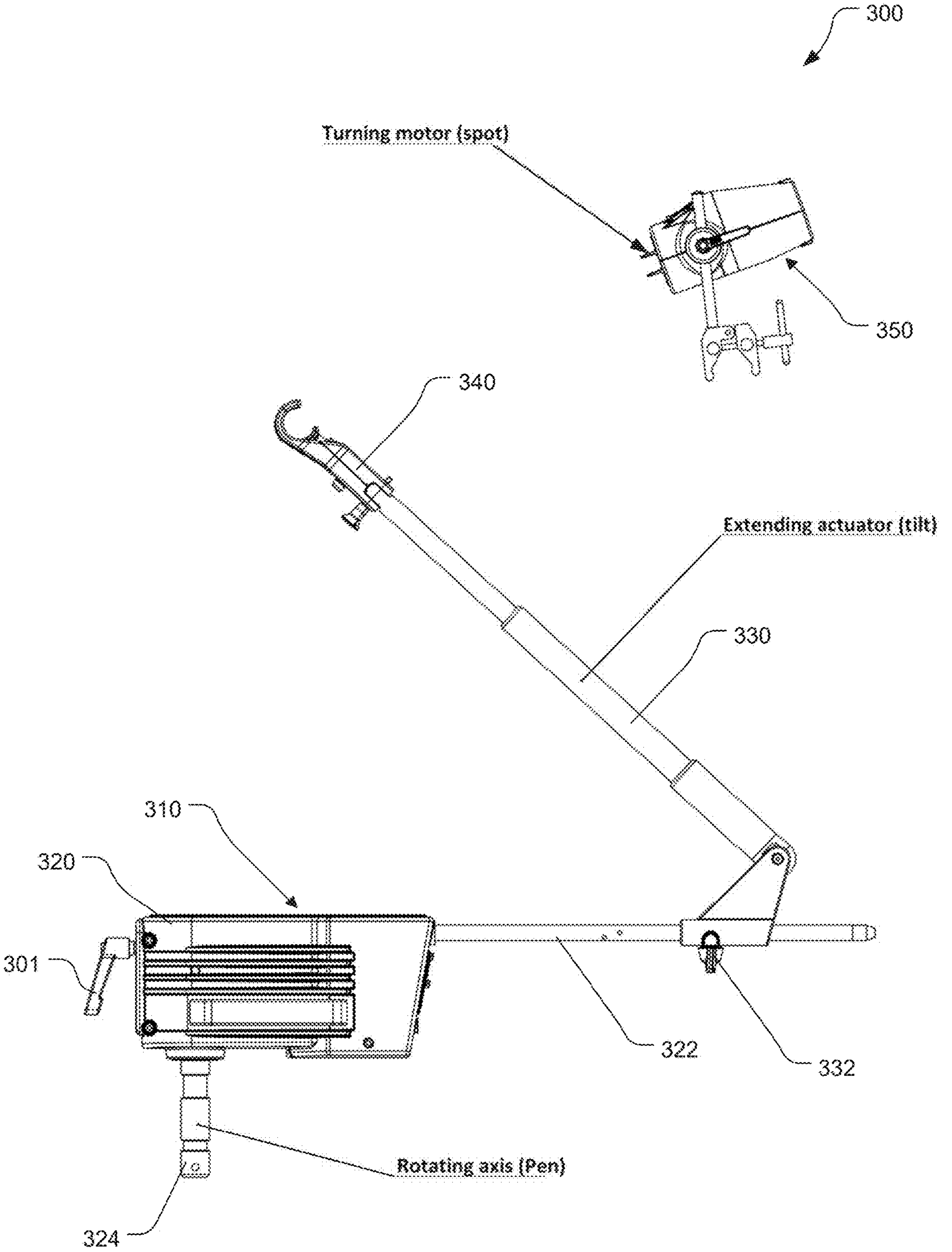
FIG. 3 is a side view of the main components of the remote light adjustment apparatus in accordance with one or more embodiments of the present invention.
Figure 4:
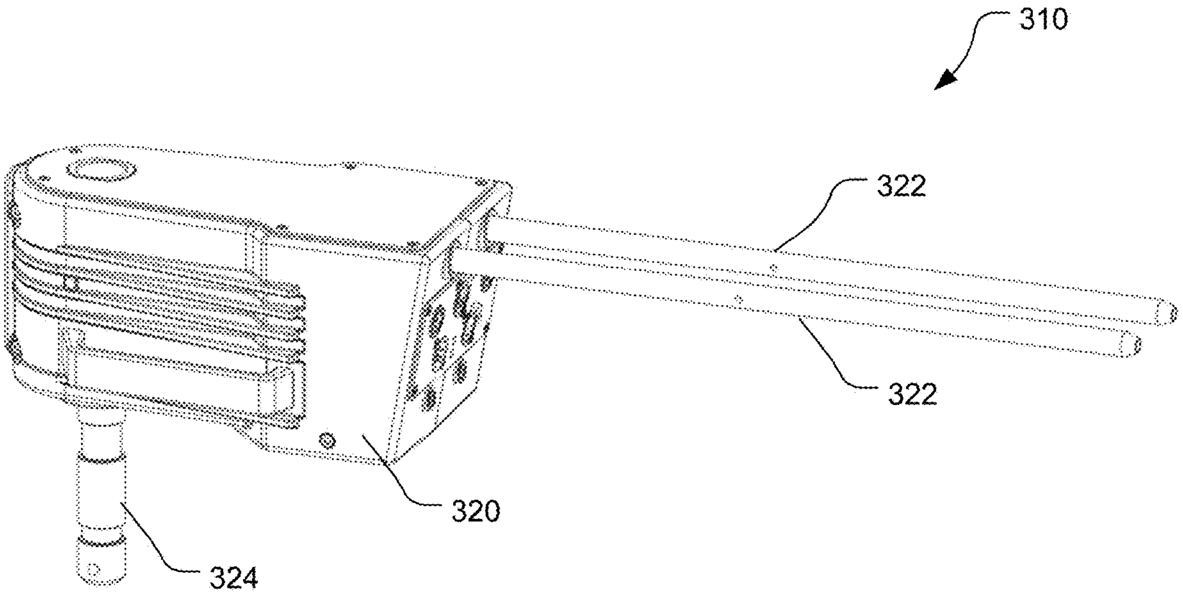
FIG. 4 is a perspective view of the main body of the remote head of the remote light adjustment apparatus in accordance with the present invention.
Figure 5:
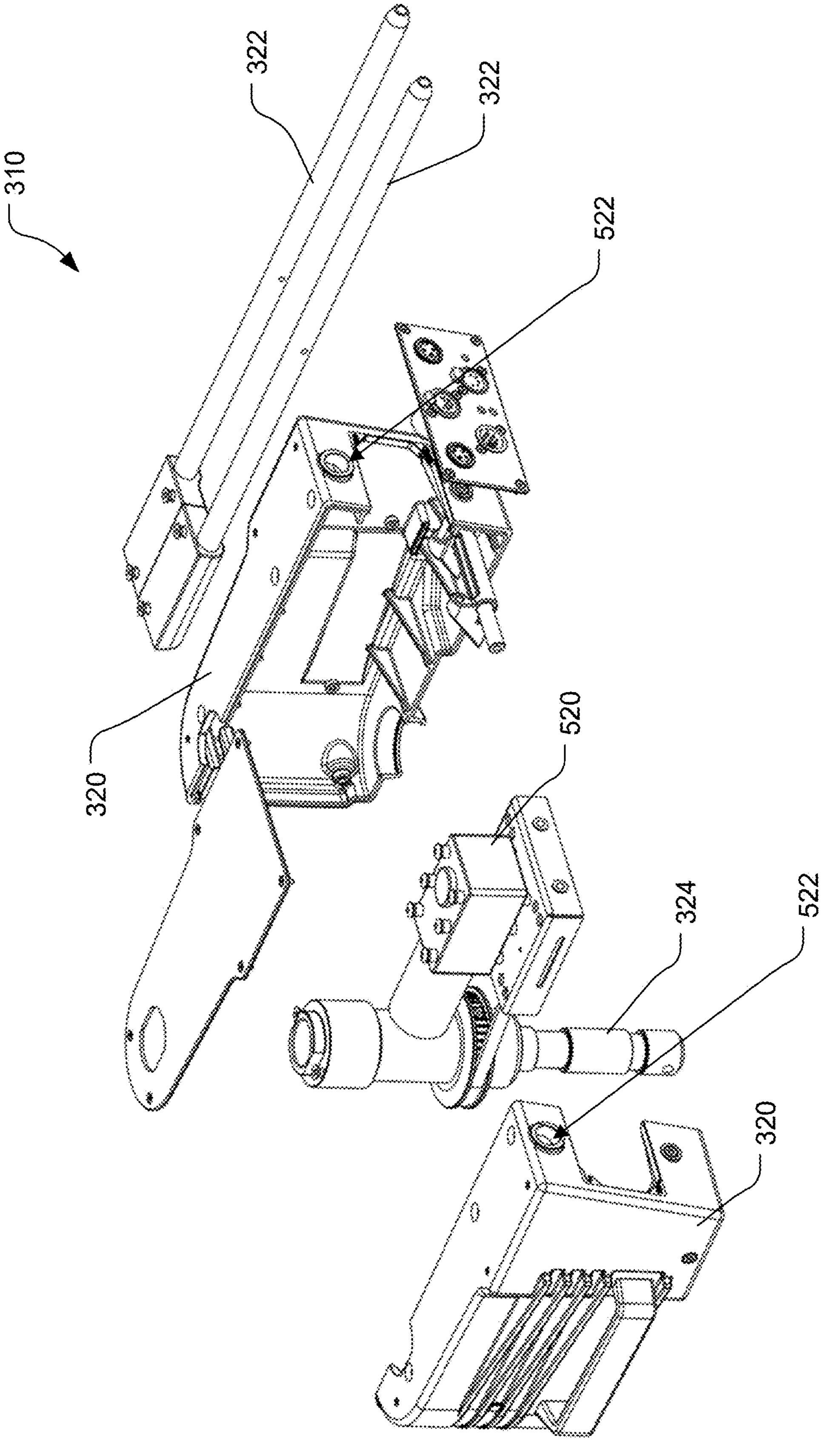
FIG. 5 is an exploded view of the main body of the remote head of the remote light adjustment apparatus in accordance with the present invention.
Figure 6:
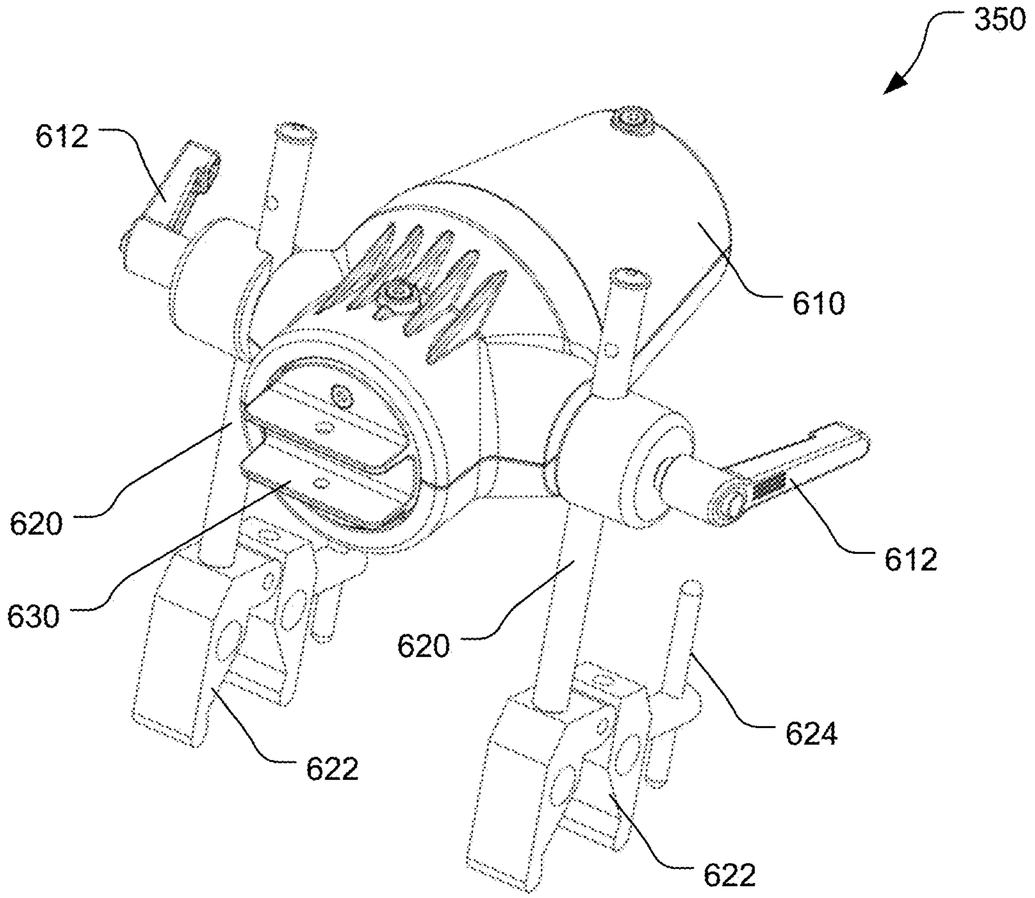
FIG. 6 is a perspective view of the remote body of the remote head of the remote light adjustment apparatus in accordance with the present invention.

As illustrated more clearly in FIG. 2, the remote light adjustment apparatus 300 of the present invention is configured to operate with one or more light fixture 110. Coupled to light fixture 110 via coupling arms 113 is an optional reflector 112. Light fixture 110 is secured to tower 120, which could be a telescoping tower, for example, via u-shaped structure 210 with its two upper ends 214 coupled to the light fixture 110 and bottom end 212 coupled to the top end of the tower 120. In one or more embodiments, ends 214 of u-shaped frame 210 is configured to allow for rotating action of the light fixture in the vertical direction, i.e. rotate up and down along the pivot axis which extends from one end 214 to the corresponding end 214 of the u-shaped frame 210.

Further coupled to the bottom end (or top end, depending on configuration) of light fixture 110 is a rectangular structure 220. Frame 220 is configured for securing the extending actuator arm 330 at its distal end, thus providing a mechanism for tilt control of the light fixture 110. For example, when the extending actuator arm 330 extends, the light fixture 110 tilts upwards; and when the extending actuator arm 330 retracts, the light fixture 110 tilts downwards.

Structures 210 and 220 may be tubular frames or any other shaped frames suitable for securing the light fixture. In one or more embodiments, the type, shape, and material of frame structures 210 and 220 may depend on weight and strength considerations.

In one or more embodiments of the present invention, the main body 310 comprises the motorized extending actuator unit 330 for tilt control. At the distal end of the motorized extending actuator unit 330 is a coupling arm 340, which is configured for coupling to a truss like structure affixed to the light fixture, e.g. frame 220, or similar structure, for tilt control of the light fixture 110 (as illustrated in FIG. 2). Coupling arm 340 is secured to the distal end of extending actuator unit 330 via coupling pin 842. As illustrated, coupling pin 842 allows for panning motion of the light fixture.

In one or more embodiments of the present invention, the main body 310 further comprises an actuator unit 520 for pan control via the panning component 324; one or more rails 322 for securing the extending actuator unit 330 to the main body; a body frame 320; apertures 522 for the rails 322; and a handle 301 for latching the main body 310 to the tower 120. Power for the main body may be provided via batteries or electrical outlets. The main body 310 may be mounted in standing or underslung (not shown) configurations.

Figure 7:
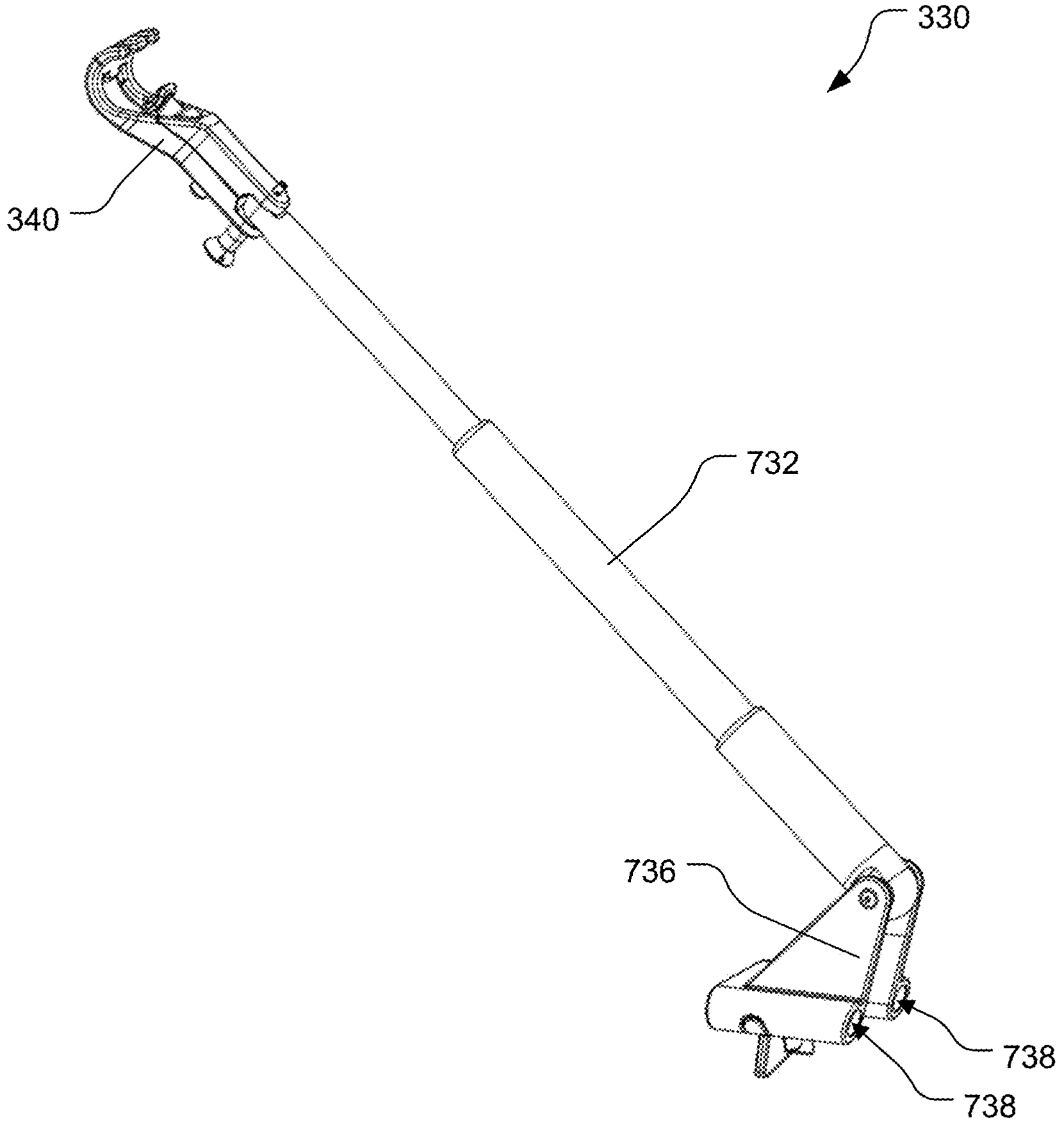
FIG. 7 is a perspective view of the extending actuator arm of the remote light adjustment apparatus in accordance with the present invention.
Figure 8:
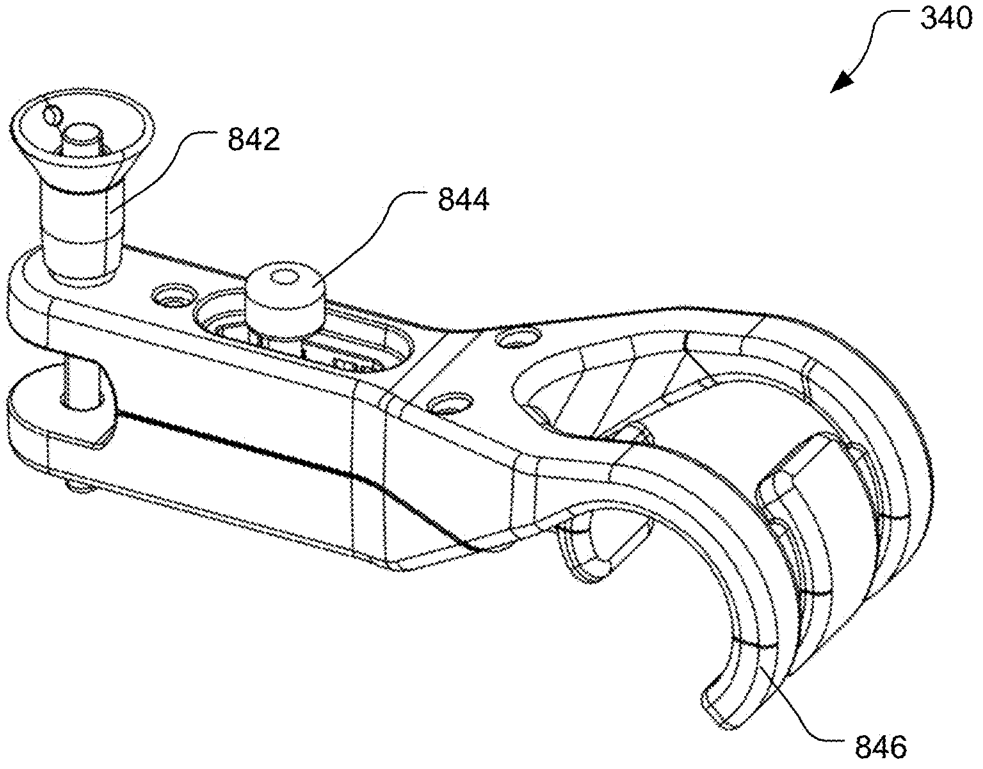
FIG. 8 is a perspective view of the clawing handle of the extending actuator arm of the remote light adjustment apparatus in accordance with the present invention.
Figure 9A:
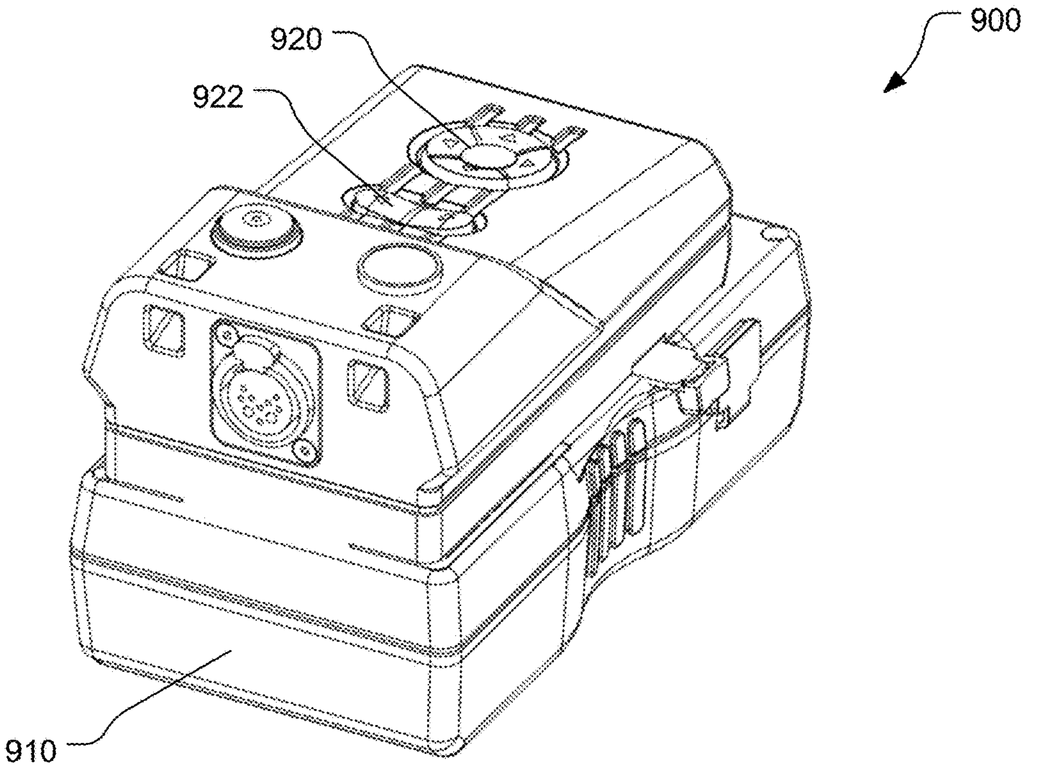
FIGS. 9A-B are perspective views of the hand control unit of the remote light adjustment apparatus in accordance with one or more embodiments of the present invention.
Figure 9B:
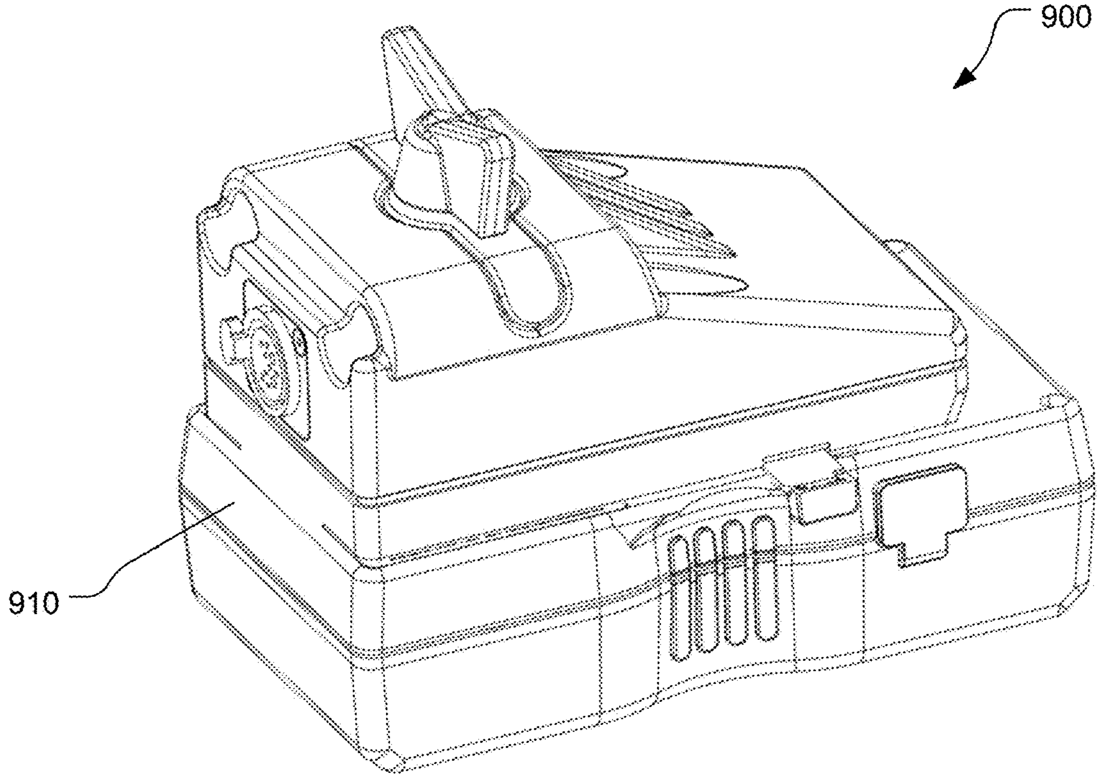

In one or more embodiments, the extending actuator unit 330 is secured to the rails 322 via latching mechanism 332. As illustrated in FIG. 7, the extending actuator arm 330 further comprises a plurality of telescopic tubular members 732 coupled at one end to coupling arm 340 and to a second end to structure 736, which comprises one or more (e.g. two in this illustration) orifices 738 for securing the rails 322, wherein each rail extends through an orifice 738 and is clamped therein.

In one or more embodiments, coupling arm 340 comprises claws 846 for gripping the distal end of rectangular frame 220 and configured to be secured with sliding bolt 844.

In one or more embodiments of the present invention, the remote light adjustment apparatus 300 further comprises a remote body 350, comprising a turning motor with an end bracket (or head) 630 that is configured to be couplable to a control handle on the light fixture for spot control of the light. Remote body 350 comprises turning motor housing 610; and a first leg 620 on the left side and a second leg 620 on the right side, each leg having a foot 622 configured for securing to the proximal end of frame 220, near the rear end of the light fixture 110. Each one of foot 622 comprises a vice handle 624 for clamping the foot to frame 220.

In one or more embodiments, each leg 620 comprises an extendable vertical rod that is configured to be secured to the motor body via vice handles 612.

One or more embodiments of the remote light adjustment apparatus 300 further comprises hand, pin, and clamp connectors, a 90-degree coupler, assorted support rods, and a manual push-button hand control 900.

In one or more embodiments, the hand control unit 900 comprises body 910 and control buttons 920 and 922 for issuing commands, e.g. pan and tilt, to the main body and the remote body, e.g. luminance control.

While the invention herein disclosed has been described by means of specific embodiments and applications thereof, numerous modifications and variations could be made thereto by those skilled in the art without departing from the scope of the invention set forth in the claims.

What is claimed is:

1. A remote light adjustment device comprising:

a main body couplable to a light fixture and configured to be secured to an external structure;

a first motor in said main body for pan control of the main body on the external structure, wherein said pan control of the main body translates into panning movement of the light fixture;

an extending arm coupled to the main body via one or more rails and to the light fixture, wherein the extending arm comprises a plurality of telescopic tubular members configured to provide tilt control of the light fixture; and a remote body couplable to the light fixture for control of the light fixture.

2. The remote light adjustment device of claim 1, wherein said main body is coupled to said external structure via a tubular component at a rotating axis of said main body.

3. The remote light adjustment device of claim 1, wherein said main body further comprises a latching handle for securing said main body to said external structure.

4. The remote light adjustment device of claim 1, wherein said extending arm further comprises one or more claws for gripping a distal end of the extending arm to a distal end of a rectangular frame coupled to a bottom side of said light fixture.

5. The remote light adjustment device of claim 1, wherein said extending arm is motorized for extension control.

6. The remote light adjustment device of claim 1, wherein said external structure is a tower.

7. The remote light adjustment device of claim 6, wherein said light fixture is secured to a top end of said tower via a u-shaped structure, said u-shaped structure comprising a bottom end secured to the top end of the tower, and two upper ends coupled to the light fixture to provide for vertical rotational movement of the light fixture about said u-shaped structure.

8. The remote light adjustment device of claim 6, wherein said tower is telescopic.

9. The remote light adjustment device of claim 4, wherein said remote body is further secured to a proximal end of said rectangular frame.

10. A remote light adjustment device comprising:

a main body couplable to a light fixture and configured to be secured to an external structure;

a first motor in said main body for pan control of the main body on the external structure, wherein said pan control of the main body translates into panning movement of the light fixture;

a rectangular frame coupled to a bottom side of said light fixture;

an extending arm coupled to the main body via one or more rails and to a distal end of the rectangular frame, wherein the extending arm comprises a plurality of telescopic tubular members configured to provide tilt control of the light fixture; and a remote body couplable to a control mechanism of the light fixture and secured to a proximal end of said rectangular frame, wherein said remote body provides for functional control of light in the light fixture via the control mechanism.

11. The remote light adjustment device of claim 10, wherein said main body is coupled to said external structure via a tubular component at a rotating axis of said main body.

12. The remote light adjustment device of claim 10, wherein said main body further comprises a latching handle for securing said main body to said external structure.

13. The remote light adjustment device of claim 10, wherein said extending arm further comprises one or more claws for gripping a distal end of the extending arm to a distal end of the rectangular frame.

14. The remote light adjustment device of claim 10, wherein said extending arm is motorized for extension control.

15. The remote light adjustment device of claim 10, wherein said external structure is a tower.

16. The remote light adjustment device of claim 15, wherein said light fixture is secured to a top end of said tower via a u-shaped structure, said u-shaped structure comprising a bottom end secured to the top end of the tower, and two upper ends coupled to the light fixture to provide for vertical rotational movement of the light fixture about said u-shaped structure.

17. The remote light adjustment device of claim 15, wherein said tower is telescopic.

18. The remote light adjustment device of claim 10, wherein said remote body further comprise adjustable legs and claws securing to said rectangular frame.

* * * * *